Sept. 23, 1924.  
G. L. BOSSARD ET AL.  
1,509,663  
RAILWAY TRAIN PROTECTION SYSTEM  
Filed Aug. 7, 1919  
6 Sheets-Sheet 3
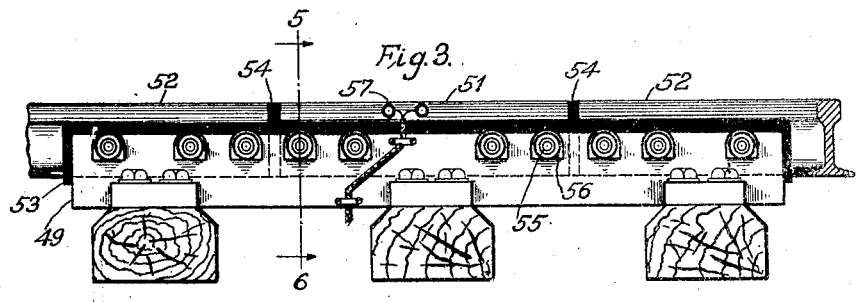
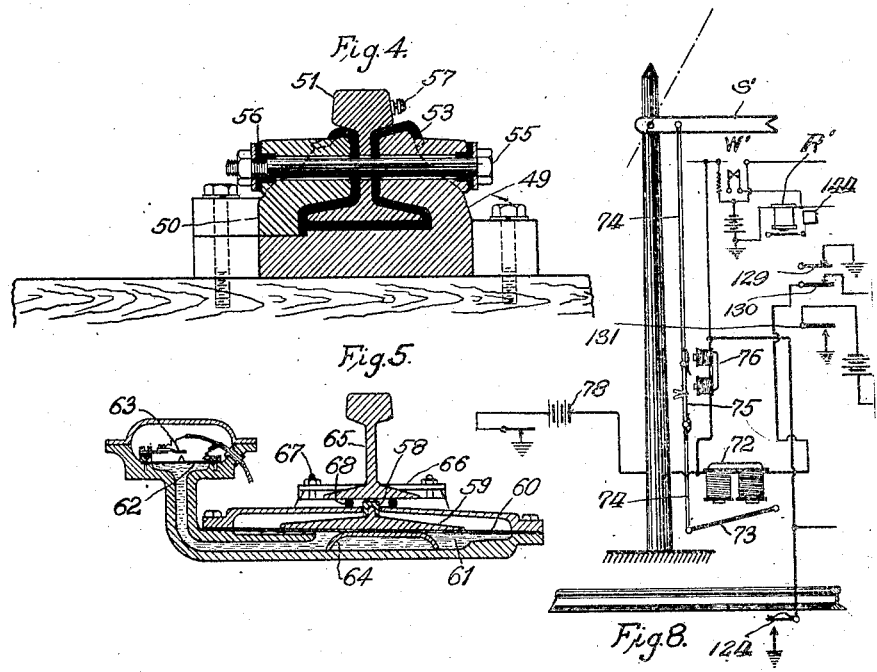
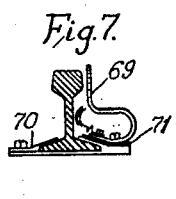
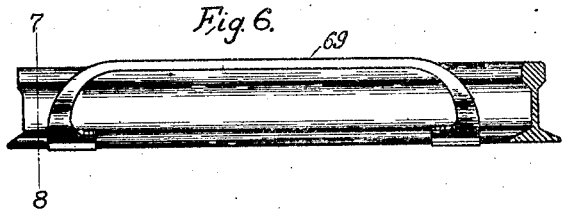

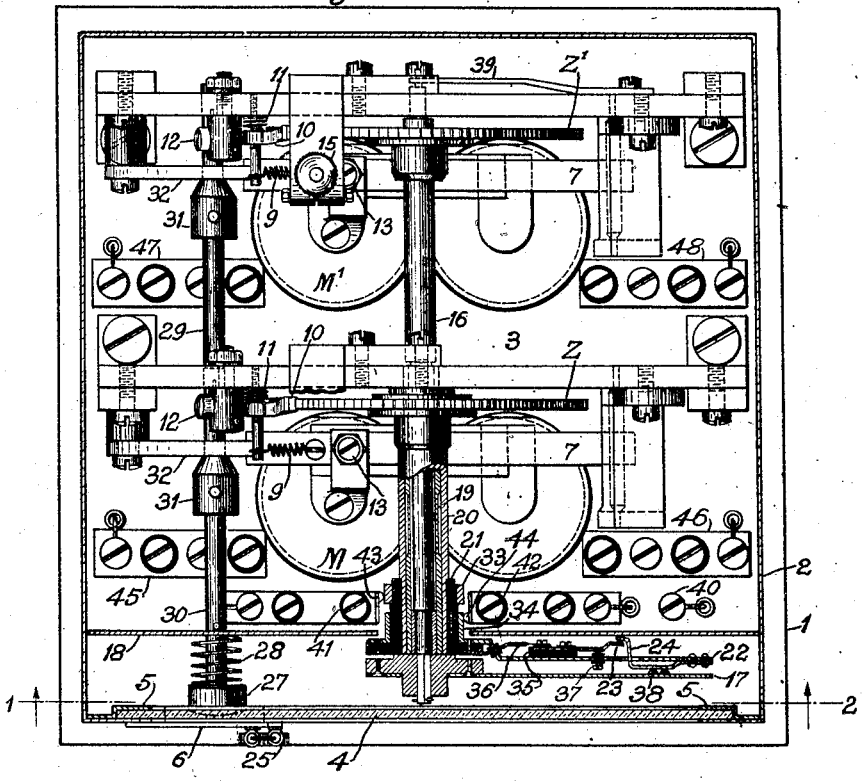

Sept. 23, 1924.
G. L. BOSSARD ET AL
RAILWAY TRAIN PROTECTION SYSTEM
Filed Aug. 7, 1919   6 Sheets-Sheet 4
1,509,663
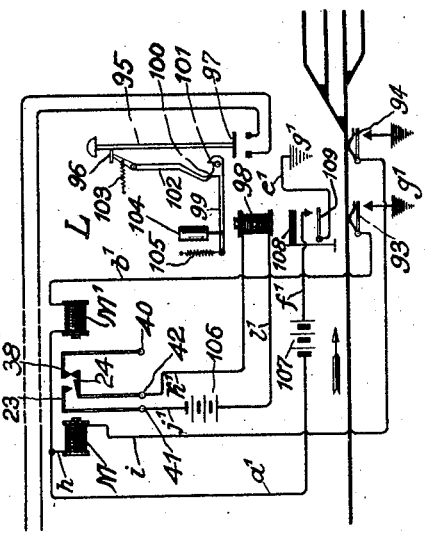
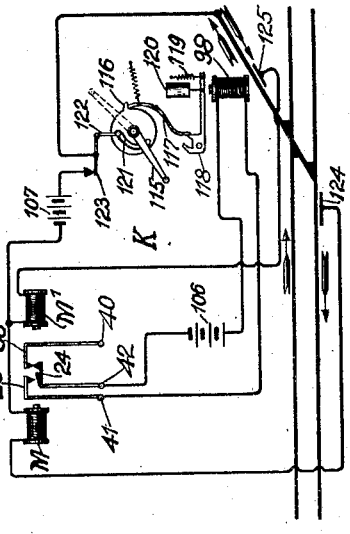
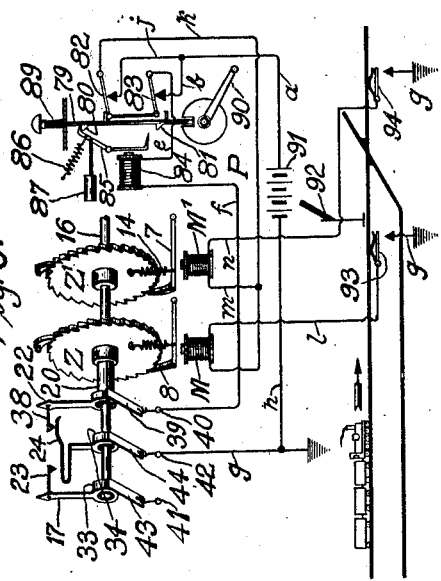
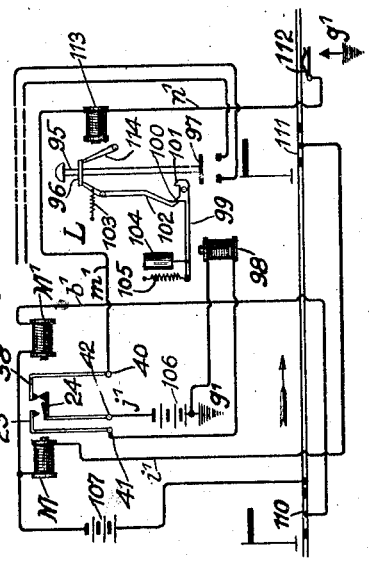
WITNESSES:
Della McClellan
Gottlieb Wuethrich.
INVENTORS
Gisbert L. Bossard
Rud. Jaugg Sept. 23, 1924.

G. L. BOSSARD ET AL 1,509,663

RAILWAY TRAIN PROTECTION SYSTEM

Filed Aug. 7, 1919   6 Sheets-Sheet 5

WITNESSES:

INVENTORS

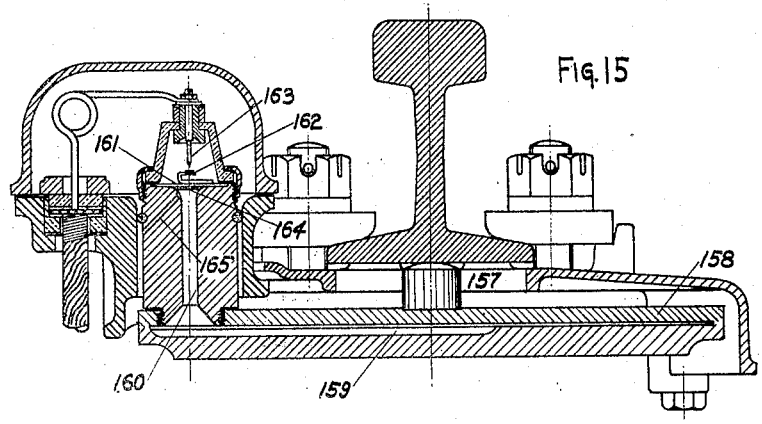
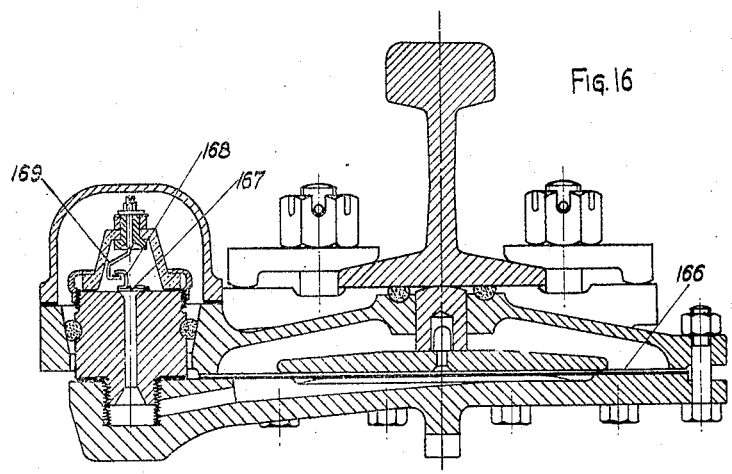

Patented Sept. 23, 1924.

1,509,663

UNITED STATES PATENT OFFICE.

GISBERT L. BOSSARD, OF AMSTERDAM, NEW YORK, AND RUDOLF ZAUGG, OF BERN, SWITZERLAND, ASSIGNORS, BY DIRECT AND MESNE ASSIGNMENTS, TO BOSSARD RAILWAY SIGNAL CORPORATION, OF TROY, NEW YORK.

RAILWAY-TRAIN-PROTECTION SYSTEM.

Application filed August 7, 1919. Serial No. 315,885.

*To all whom it may concern:*

Be it known that we, GISBERT L. BOSSARD, a citizen of Switzerland (but having formally declared my intention of becoming a citizen of the U. S. A.), and a resident of Amsterdam, Montgomery County, New York, and RUDOLF ZAUGG, a citizen of Switzerland, and resident of Bern, in that Confederation (whose post-office addresses are respectively as above given), have invented a new and Improved Railway-Train-Protection System, of which the following description, in connection with the accompanying drawings, is a specification.

Our invention relates to railway train protection by automatic wheel recorders for electric and steam railways, and its object is to provide an efficient protection with a view to prevent collisions, the premature or unauthorized opening of switches or signal apparatuses; and to dispense with insulated track rails, reactance bonds, impedance coils, track relays, special road-bed drainage, and the like.

The invention comprises the necessary apparatuses to constitute a complete system of railway train protection; but where desired, it can easily be combined with other existing systems of like character.

A practical embodiment of the invention is represented in the accompanying drawings forming a part of this specification, in which similar characters of reference indicate corresponding parts in all views.

Figs. 1 to 7 inclusive, illustrate indicating devices; Fig. 8 is a diagrammatical view of a safety device; and Figs. 9 to 14 inclusive, show diagrammatically different modes of application; Figs. 15 and 16 illustrate rail contact-making devices, operated by compressed air, which is generated by the deflection of the rail when a car unit passes over said rail.

Fig. 2 is a sectional plan view of the wheel recorder on the line 3—4 of Fig. 1.

Fig. 3 is a side elevation of an insulated contact rail.

Fig. 4 is a vertical section of the insulated contact rail on the line 5—6 of Fig. 3.

Fig. 5 is a vertical section of a rail contact-making device, actuated by the deflection of the rail.

Fig. 6 is a side elevation of a contact-making device actuated by the wheel flanges of a passing train.

Fig. 7 is a vertical section of the contact-making device on line 7—8, of Fig. 6.

Fig. 8 is a diagrammatical view of a safety device.

Fig. 9 is a diagrammatical view illustrating the electric interlocking of a switch.

Fig. 10 is a diagrammatical view illustrating an electric plunger lock for manual operated block system.

Fig. 11 is a view similar to Fig. 10, but illustrating a different condition of some of the circuits and parts due to the presence of additional safety devices.

Fig. 12 is a diagrammatical view illustrating the electrical interlocking of a track, switch, or signal, lever.

Fig. 15 is a vertical section of a rail contact-making device, actuated by the deflection of the rail, and having a movable membrane.

Fig. 16 is a vertical section of a rail contact-making device, actuated by the deflection of the rail, having a special spring pressure membrane in connection with the air receptacle, and a valve in connection with the contact spring.

Fig. 17 is an enlarged detail view of the toggle joint shown in Fig. 8.

We will now proceed to describe our invention in connection with said drawings, it being understood, however, that we do not limit ourselves in setting forth the details thereof, as they may be amplified or changed in their construction and combination without departing from our invention.

Figure 1:
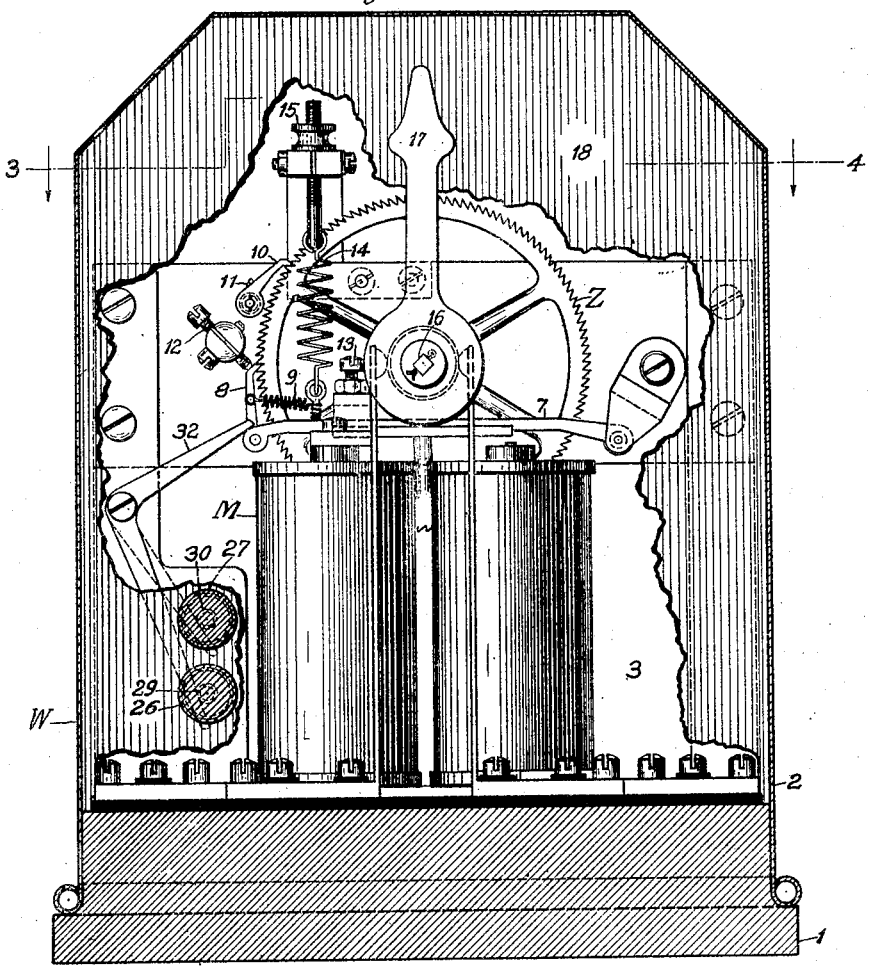
Fig. 1 is a vertical section of an automatic wheel recorder on the line 1—2, Fig. 2.

Referring more particularly to Figs. 1 and 2, W designates an automatic wheel recorder, which comprises two sets of mechanisms, which we shall presently describe, premising that their operation is essentially the same in each instance.

Each mechanism comprises two electromagnets designated M and M', respectively, which are secured to a suitable base 1, which together with casing 2 forms a convenient housing or compartment 3 for the various operating and other parts.

Casing 2 contains a circular opening covered with a transparent disc 4, see Fig. 2, preferably glass, which is retained in the recess 5, enabling an observer to note the positions of the index pointers forming part of the operating mechanism. Slide 6, which is ordinarily sealed to casing 2 to prevent unwarranted tampering with the apparatus, gives access to two resetting keys.

The upper extremities of each pair of magnets are bridged by an armature lever 7, pivotally supported as shown. Armature 7 carries on its swinging extremity a ratchet-pawl 8, suitably secured, which ratchet pawls engage with the teeth of the ratchet-wheels Z and Z′, respectively, a small helical spring 9, located as shown, furnishing the necessary tension. Locking-pawl 10, by means of torsional spring 11, prevents the backward movement of the ratchet-wheels Z and Z′, respectively. Abutment screws 12 and 13 limit the movement of armature levers 7; furthermore, each abutment screw 12 or 13, owing to its relative position to ratchet-pawl 8, prevents the forward movement of the ratchet-wheel Z or Z′, when the armature 7 is at rest and the electromagnet is deenergized.

When the electro-magnets M and M′, respectively, are influenced by an electric current, armature lever 7 is attracted against the pull of helical spring 14, the tension of which is adjustable through set-screw 15. At each attraction of armature lever 7 with its subsequent upward movement, ratchet-pawl 8 moves its respective ratchet-wheel Z or Z′, depending upon which set of magnets is energized, forward through the distance of one tooth, causing its corresponding index-pointer 17 or 22 to move through relatively the same distance. The two ratchet-wheels contain each the same number of teeth, each wheel having more teeth than the longest train influencing the instrument has wheel-axles.

Ratchet-wheel Z′ is rigidly connected through its shaft 16, the latter being securely mounted rotatively in the supporting frame of the instrument mechanism, with a colored index-pointer 17, that operates in front of a differently colored background 18. Upon the first half of supporting shaft 16 is fitted a sleeve 19, upon which is mounted the ratchet-wheel Z with its shaft 20 bored out to fit sleeve 19. Rigidly connected to ratchet-wheel Z through shaft 20, which is shown in Fig. 2 partly broken away and in section in order to show the various working parts, and insulation sleeve 21 is the index-pointer 22, which carries contacts 23 and 24.

To reset the ratchet-wheel Z or Z′ it is only necessary to break seal 25 on slide 6, which gives access to resetting keys 26 and 27; the keys are then pushed in horizontally against the pressure of helical spring 28, which bears against plate 18. The resulting horizontal motion is transmitted through shafts 29 and 30, respectively, and cone 31 to a lever 32, pivoted as shown, which depresses armature 7 once for each movement of the resetting key, causing the respective ratchet-wheel to move forward each time through the distance of one tooth. Helical spring 28 returns the resetting key each time to its original position. Upon insulated sleeve 21 are mounted two collector rings, 33 and 34. Collector ring 33 is connected with contact spring 23, which is mounted upon index-pointer 22 and insulated therefrom through insulation block 35, through insulated wire 36. An insulated adjustment screw 37 allows ready adjustment of the air gap between contact-spring 23 and 24.

Collector ring 34, forming the lower end of index-pointer 22, is in direct electrical connection with contact-spring 24.

Index-pointer 17 carries a contact-tip 38, which is connected with terminal 40 through index-pointer 17, shaft 16, spring 39 and an insulated wire, not shown. Collector rings 33 and 34, respectively, are connected with their respective terminals 41 and 42 through brushes 43 and 44, which bear against the collector rings. Terminals 40, 41 and 42 are to be connected with the outside circuit controlled by the automatic wheel-recorder. When index-pointers 17 and 22 are in a position where they cover each other, contact-spring 24 and contact-tip 38 will form an electrical connection; in any other position this connection will be broken, but in that case another electrical connection is formed by contact-spring 24 and contact 23.

The electrical circuit may be traced as follows:—Outside circuit controlled by instrument—terminal 40—insulated wire—spring 39—shaft 16—index-pointer 17—contact-tip 38—contact-spring 24—index-pointer 22—collector ring 34—brush 44—terminal 42—back to outside circuit. Or the electrical circuit may be as follows:—Outside circuit—terminal 41—brush 43—insulated wire 36—contact 23—contact-spring 24—index-pointer 22—collector ring 34—brush 44—terminal 42—back to outside circuit controlled by instrument.

The terminal boards 45, 46, 47 and 48 are provided to facilitate the connections of the electro-magnets M and M′, respectively, to their respective circuits.

In connection with this description we desire to have it understood that we do not in any way limit ourselves to the details of the construction as described, as we are well aware that this automatic wheel recorder can be constructed in a number of different ways, still inside the scope of our invention.

In Figs. 3 and 4, we show an insulated rail 51 for railway-tracks that is shorter than the smallest existing distance between the axles of the wheels and generally is from 0.5 to 1 meter long, 49 and 50 are iron fishplates placed alongside of the rails. These fishplates, which are shaped to fit against the web of the rail and bear against the under side of the head of the rail and on top of the flange, connect the track-rails 52 to the short, insulated rail 51. Rail 51 is embedded between layers of insulation 53 as shown, while insulation disks 54, having a contour corresponding to that of the rail, are interposed between adjoining ends of the rails 51 and 52, respectively. The fishplates are drawn against the rails by means of bolts 55, passing through said parts and the web of the rails. In order to insulate the bolts from the fish-plates, flanged sleeves 56 of insulation material surround the bolts where they pass through the fish-plates, the flanges of the sleeves extending between the fish-plates and the heads and nuts on the bolts. The insulated rail 51, and to a sufficient length, track-rails 52, rest upon the horizontal bridge portion of fish-plate 49, which is bolted down to the rail ties, being an improved mechanical strong, well insulated contact-rail forming part of our invention. Connection screws 57 are used to connect the short insulated contact-rail 51 into circuit.

Fig. 5 is a vertical section of a contact-making device actuated by deflection of rail and filled with mercury. The deflection of the rail caused by the load of the wheels acts on the plunger 58 of the pressure plate 59, thereby depressing the steel membrane 60 and forcing the mercury 61 from under it into the ascending tube under the membrane 62. The membrane 62 is lifted a greater distance than the distance that membrane 60 travels, depending upon the surface relation of 60 to 62, thereby closing contact 63. Spring-membrane 64 hastens the immediate return of the mercury as soon as the pressure of the wheels ceases, which causes contact 63 to open. The apparatus is attached to the lower flange of the track-rail 65 by means of a clamping attachment 66 and bolts 67. To prevent moisture from penetrating to the inside of the instrument, a rubber ring 68 is provided as shown. The use of this improved contact-making device forming part of our invention, will do away with the use of insulated rail-joints and the like.

In Figs. 6 and 7, 69 is a yielding detector bar, actuated by the wheel flanges of a passing train, making and breaking contact of its corresponding circuit each time a wheel flange passes over it. Detector bar 69 is attached to the flange of track-rail by means of a clamping device 70, from which it is electrically insulated through layers of insulation material 71.

In Fig. 8 is shown an automatic safety device, the object of which is to compel the correct operation of the automatic wheel recorders when part of an automatic block-signal system, so that the signals for a following train can move into the "proceed or clear" position only when the wheel recorders have operated correctly. We shall presently describe the operation of the device, which comprises the signal-operating magnet 72 with its armature 73, a sectional signal-rod 74 with a toggle-joint 75 composed of the pivotal links 75' which have their adjacent ends formed with curved lips 74'. Spring fingers 73' are secured to the inner ends of the sectional rod 74 and engage the links 75' so as to normally maintain the links 75' in alignment with the rod 74, as shown in dotted lines in Fig. 17. The toggle joint 75 when the rod 74 is moved upward is arranged to be brought in front of an electro-magnet 76 of which it constitutes the armature. Rail-contact 124 controls the flow of current from the signal battery 78 through the magnet 76.

The toggle-joint, 75, may be of any known form such that when the semaphore is in elevated position indicated by the dotted line in Fig. 8, the flexing of the joint when attracted by the electromagnet, 76, will cause the semaphore to be moved downward to horizontal position as shown by solid lines in said figure.

In describing the operation of the safety device we will assume that a train is approaching the signal, and that the signal is in the clear or proceed position as indicated by a dotted line with armature 73 attracted by magnet 72, causing the toggle joint 75 to move in front of magnet 76. As soon as the train reaches contact 77, the magnet 76 will be energized, so as to attract the links 75' towards it as shown in Fig. 17, and thus release the rod 74 and actuate the signal S the combined weight of the signal blade and signal rod will cause the signal blade or arm S' to move to the horizontal position of "danger or stop." If the automatic wheel recorder now proceeds to operate as it should, armature 73 will be released by magnet 72, causing the toggle joint to return to its former position, thus being ready for a following train to go through a similar cycle of operation.

In Fig. 9 is shown diagrammatically the automatic wheel recorder, connected in circuit with an electric plunger lock, according to Figs. 1 and 2. The ratchet-wheels Z and Z' with their index-pointers 17 and 22, respectively, are operated by ratchet-pawl 8 through armature levers 7, when an electric current influences electro-magnets M and M'. Terminals 40 and 42 with brushes 39 and 44, respectively, are connected in circuit, while terminal 41 remains unemployed. P is a hand-operated electric plunger lock for a track-or switch lever, comprising locking rod 79 with catches 80 and 81, and contact-making devices 82 and 83, respectively; 84 is the releasing magnet with its locking crank lever 85, spring 86 and dash-pot 87. Spring 89 causes the locking rod 79 with its contacts 82 and 83 to open the circuit as soon as locking crank-lever 85 has completely released the locking rod 79, releasing at the same time track-or switch-lever 90. Battery 91 furnishes the operating current; 92 is a semaphore signal indicating the condition of the switched track, the signal being operated manually. 93 and 94 are rail-contacts being operated by the wheels of a passing train; these rail-contacts should always be placed 15 meters or more apart.

Fig. 10 shows diagrammatically an electric plunger lock L, with an automatic wheel recorder connected as shown, for a manual operated block system. The automatic wheel recorder, while essentially the same as illustrated in Fig. 9, is shown in Figs. 10, 11 and 12 in a more simplified manner. The plunger lock L comprises a locking-rod 95 with catch 96 and contact 97, a releasing magnet 98 with its locking-armature 99 having catch 100 and 101 that engage with the locking-pawl 102, a spring 103, a dash-pot 104, a spring 105 and rail-contacts 93 and 94. Battery 106 furnishes current for the operation of the releasing magnet; battery 107 supplies current to the automatic wheel recorder; 108 is a semaphore signal with an electric contact-making device 109 operated by the signal rod.

Fig. 11 comprises a similar electric plunger lock for manual operated block system as shown in Fig. 10, but illustrating a different condition of some of the circuits and parts due to the presence of an additional releasing magnet 113 with locking pawl 114 and rail-contact 112.

Fig. 12 shows an electric locking device K, connected with an automatic wheel recorder as shown, for the locking of a track-switch-or signal lever 115. The nose 116 is locked through the locking lever 117, which is maintained in the locked position by the magnet armature 118 acting against the tension of spring 119 and the pull of dash-pot 120. The curved guide 121 operates the crank lever 122 with contact 123 which latter opens or closes the circuit of the automatic wheel recorder.

Figure 13:
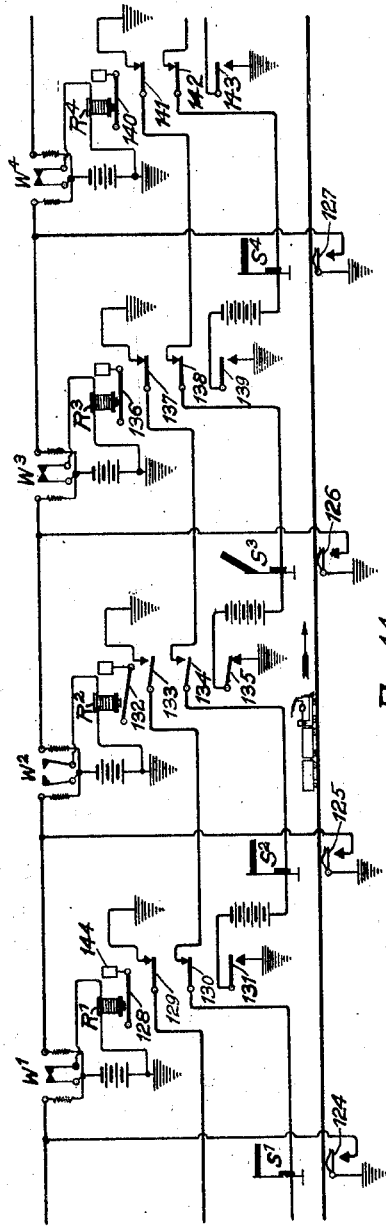
Fig. 13 is a diagrammatical view illustrating an automatic block signal system with signals normally in the "stop or danger" position.

Fig. 13 shows diagrammatically an automatic block signal system with semaphore signals, which are normally in the "danger or stop" position. The signals are designated as $S^1$, $S^2$, $S^3$, $S^4$, respectively. $W^1$, $W^2$, $W^3$, $W^4$ represent the automatic wheel recorders that are controlled from the rail-contacts 124, 125, 126 and 127, respectively, by the wheels of a passing train. $R^1$, $R^2$, $R^3$, $R^4$ are switch-relays controlled by the automatic wheel recorders.

Figure 14:
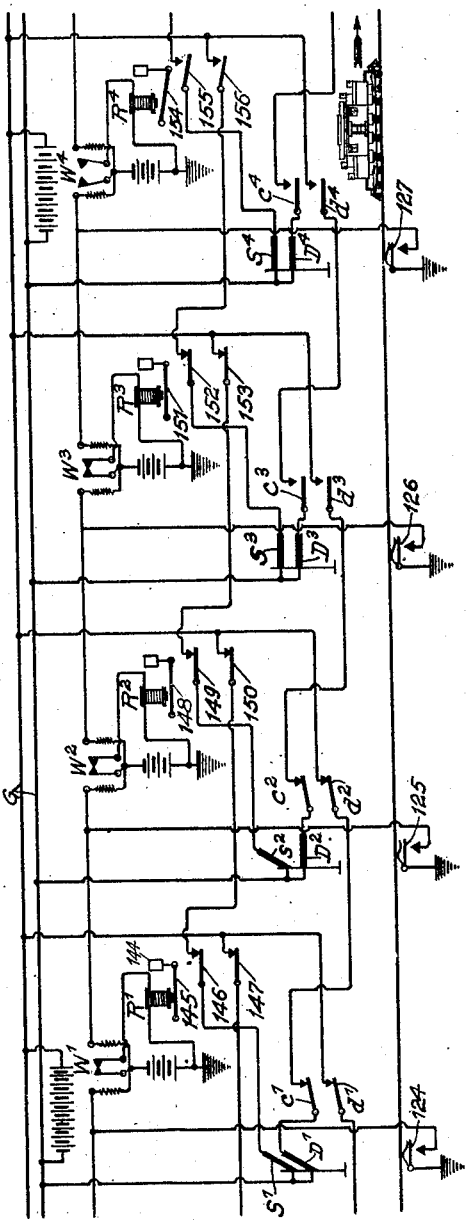
Fig. 14 is a diagrammatical view illustrating an automatic block signal system with signals normally in the "clear or proceed" position.

Fig. 14 shows diagrammatically an automatic block signal system with the semaphore signals normally in the position "line clear or proceed." The semaphore signals comprise home signals $S^1$, $S^2$, $S^3$, $S^4$ and distant signals $D^1$, $D^2$, $D^3$, $D^4$. Contacts $c^1$—$d^1$ to $c^4$—$d^4$ are operated by the signal rods $W^1$, $W^2$, $W^3$, $W^4$, are the automatic wheel recorders controlled from the rail-contacts 124, 125, 126, and 127. $R^1$, $R^2$, $R^3$, and $R^4$, are the switch relays controlled by the automatic wheel recorders. G is a common feeder for the signals.

Fig. 15 is a vertical section of a rail contact-making device actuated by deflection of rail. The deflection of the rail, caused by the passing of a car-wheel, acts on the plunger 157 of the pressure surface 158 of the air receptacle 159, thereby compressing the air in receptacle 159. This compressed air, in trying to escape through air vent 160, operates membrane 161, which latter forces contact spring 162 against contact point 163, thereby closing an electric circuit. The membrane 161 is lifted the multiple of the distance that the pressure surface plate 158 travels, depending upon the surface relation of 158 to 161, assuming that the exposed part of the contact-making membrane has the same surface area as air vent 160. The movement of the air in the air vent 160 acts not in accordance with that of a liquid, the movement of which would be governed by the amount deplaced in the receptacle, but inasmuch as air is elastic, the membrane movements stops after the pressure has been equalized. In this manner a greater or smaller deflection of the rail is converted into a uniform movement of the membrane 161, inasmuch as mainly, only the first generated impact of the compressed air counts. As soon as the pressure of the car-wheels ceases, the surface pressure plate 158 of the air receptacle 159 returns to its original position, and the resultant suction returns the flexible contact membrane 161 to a sheet-metal sieve, 164 which is arranged underneath the membrane 161. This downward movement of the contact membrane opens the circuit between contact spring 162 and contact point 163. A small air vent 165, if provided, allows the compressed air to escape, so that only the first impulses are effective.

Fig. 16 is a vertical section of a similar rail contact making device, as described under Fig. 15, and in its normal inoperative position closes the circuit, whereas contact-making device, Fig. 15, in its inoperative position holds the circuit open. In Fig. 16 the separately arranged elastic pressure membrane 166 forces the air against an air valve 167, which in lifting the contact spring 168 from contact 169 opens the circuit. The opening of the air valve 167 allows the compressed air to escape, and further operation takes place after a comparatively longer interval of time, inasmuch as the air occupies more time in leaking back into the air chamber over the loosely fitting valve.

We shall now proceed to describe the operation of our system, which is as follows:—

Fig. 9. In order to move signal 92 into the "clear or proceed" position it is necessary to depress locking-rod 79, which engages track-or switch lever 90, locking it into position, which makes it impossible to open the switch before locking-rod 79 is electrically released. The moment locking-rod 79 is depressed or lowered, contacts 82 and 83 close the circuits that connect the battery 91 with magnets M and M', as well as magnet 84, which operates the locking crank-lever 85. One of the electrical circuits may be traced as follows:—Battery 91—wire $a$—wire $b$—contact 83—wire $e$—magnet release 84—wire $f$—terminal 40—brush 39—index 22—contact tip 38—contact spring 24—collector ring 34—brush 44—terminal 42—wire $g$—wire $h$—back to battery 91. Another may be traced as follows:—Battery 91—wire $a$—wire $j$—contact 82—wire $k$—magnet M—wire $l$—rail-contact 93—back through $g$ and wire $h$ to battery 91; and another may be traced from battery 91 to wire $a$—wire $j$—contact 82—wire $k$—wire $m$—magnet M'—wire $n$—contact 94—back through ground or rail and wire $h$ to battery 91.

As soon as the locking rod 79 is depressed, magnet 84 is energized, causing the locking crank-lever 85 to be attracted, which engages catch 80, locking the rod 79 as shown. When the train reaches the rail-contact 93 each wheel of the train will cause the electric circuit through magnet M to be closed and again opened; each such impulse will cause magnet M to attract armature lever 7, which results, through its subsequent upward movement, in the ratchet-pawl 8 moving its ratchet-wheel Z forward through the distance of one tooth, which in turn opens contacts 24 and 38; the opening of these contacts opens the circuit of magnet-release 84, causing crank-lever 85 to liberate catch 80 at one end and engage catch 81 at the other end but not fully unlocking the switch lever, 90. When the train reaches the rail-contact 94 electric impulses are sent through magnet M', which will now operate in essentially the same manner as described in the case of magnet M; ratchet-wheel Z' being advanced exactly the same number of teeth as ratchet-wheel Z, as the contacts 93 and 94 are set apart a distance greater than that of the greatest distance between wheel-axles; that is, ratchet-wheel Z' reaches the same position as ratchet-wheel Z as soon as the last axle or wheel of the last vehicle passes contact 94, but not before. When Z' has advanced the same number of teeth as Z, the index-pointers 17 and 22 will again cover each other, thereby closing contacts 24 and 38 again, causing magnet-release 84 to be energized, which again attracts locking crank-lever 85, thereby releasing catch 81 and with it locking rod 79. The dash-pot 87 has as its object to prevent the premature release of locking rod 79 in case the ratchet-wheel Z' should not be advanced the same distance as ratchet-wheel Z; that is, should Z' travel a greater distance than Z, due to some disturbance, during the moment that index 17 would cover index 22 the contacts 24 and 38 would be closed, which would cause the immediate attraction of locking crank-lever 85 and subsequent release of locking rod 79 were it not for the dash-pot 87, that limits the time of the release to an interval sufficiently long to leave the release uneffected during a short, momentarily closing of contacts 24 and 38.

Fig. 10. When the signal 108 is moved into the "clear or proceed" position, contact 109 is being closed, thereby connecting battery 107, the magnets M and M' of the automatic wheel recorder and the rail-contacts 93 and 94 into circuit. When the train passes over rail-contacts 93 and 94, respectively, the automatic wheel recorder operates in essentially the same manner as described in Fig. 9, causing contact 23 and 24 to close the circuit through magnet-release 98, the path of the current being as follows:—Battery 106—wire $j'$—terminal 41—contact 23—contact 24—wire $k'$—magnet-release 98—wire $l'$—back to battery 106. Magnet-release 98 being energized, causes armature 99 to be attracted against the pull of spring 105 and the inertia of dash-pot 104, disengaging locking-lever 102 from catch 100; locking-lever 102 through the pull of spring 103 now engages with catch 101 of armature 99. When the last axle of the last car of the train leaves rail-contact 94, the automatic wheel recorder will again open the circuit of magnet-release 98, as the ratchet-wheel Z' will have been advanced the same number of teeth as ratchet-wheel Z, thereby opening contact 23 and 24, which results in the release of armature 99, causing catch 101 to release locking-lever 102; the pull of spring 103 liberates the locking-lever from catch 96, which results in the release of locking rod 95, allowing the operator to signal back for the next train. The dash-pot 104 has been arranged for the same purpose as described in Fig. 9.

Fig. 11. The locking-lever 102 is disengaged from catch 96 in essentially the same manner as described in Fig. 10 by the train traveling over contacts 110 and 111, respectively; when the train reaches contact 112, which is placed ahead of contact 111 a distance greater than the length of the longest train operating on the track, magnet-release 113 is connected in circuit with battery 106, causing locking-pawl 114 to be attracted, thereby releasing locking rod 95, allowing the operator to signal back for the next train. The path of the current through the magnet-release may be traced as follows:—Battery 106—wire $j'$—terminal 42—contact spring 24—contact 38—terminal 40—wire $m'$—magnet 113—wire $n'$—rail-contact 112—back through ground or rail to battery 106.

The magnet-release 113 with its respective parts is provided to prevent the premature release of locking rod 95 in case the automatic wheel recorder did not operate correctly, due to some disturbance.

Fig. 12. When the track-switch-or signal-lever 115 is moved to the position indicated in full lines contact 123 is closed, connecting the battery 107 in circuit with the automatic wheel recorder and the rail contacts 124 and 125. When the train reaches rail-contact 124 contacts 23 and 24 are caused to close the circuit through releasing magnet 98 by the operation of the wheel recorder as described before; magnet 98 attracts armature 118, which allows locking-lever 117 to escape from the first catch, the final release being prevented by the second catch of armature 118. When the last axle or wheel of the last car of the train leaves contact 125, the automatic wheel recorder will again separate contacts 23 and 24, thereby opening the circuit through magnet 98, which now becomes inert, releasing armature 118 and subsequently locking-lever 117 from catch or nose 116, allowing lever 115 to be returned to the position indicated in dotted lines. As is indicated by the arrows, the system works equally well with a train moving in either direction.

Fig. 13. A train is represented as having passed signal $S^2$ and rail-contact 125, causing the automatic wheel recorder $W^2$ to open the circuit of switch-relay $R^2$; armature 132 drops and opens the circuits controlled by contacts 133 and 134, closing circuit controlled by contact 135; signal $S^3$ moves into the "clear or proceed" position, provided the next two blocks ahead are not occupied by a train. As soon as the train reaches rail-contact 126, $W^3$ opens circuit of $R^3$, armature 136 drops, causing contacts 137 and 138 to open the circuits controlled by them, and contact 139 to close the circuit through signal $S^4$, which moves to the "line clear" position, provided the track ahead is clear. The opening of contact 138 breaks the circuit through signal $S^3$, which moves to the "danger or stop" position. When the last axle or wheel of the last car of the train leaves contact 126 the automatic wheel recorder $W^2$ again closes the circuit of switch relay $R^2$; armature 132 is again attracted, closing the circuits controlled by contacts 133 and 134, and opening the circuit controlled by contact 135. The closing of the circuit controlled by contact 133 enables signal $S^1$ to again clear the block for a following train. Should the automatic wheel recorder for some reason fail to close the circuit of its respective switch-relay, the additional safety device, shown in Fig. 8, which is suitably connected to this system by the electrical circuits which control the recorder $W'$, relay $R'$ and signal S, as shown, and will force the signal to drop into the "danger" position as soon as the train reaches the corresponding rail-contact of the safety device. When the train reaches the rail-contact 127, the signal $S^4$ is again returned to the "danger" position by the operation of $W^4$, which opens the circuit through $R^4$, causing contact 142 to open the circuit of signal $S^4$. As soon as the last wheel of the last car of the train leaves rail-contact 127, $W^3$ closes circuit of $R^3$ and with it contact 137, clearing the signal circuit of signal $S^2$ for the next train; the operation being repeated at each signal-station as described above. Dash-pot 144 minimizes the danger of wrong signal indications in case of some disturbance. The train is always covered by two signals.

Fig. 14. The train is represented as having passed rail-contact 127, causing $W^3$ to close the circuit or $R^3$, which attracts armature 151, closing the circuits controlled by contacts 152 and 153, respectively, resulting in the home signal $S^2$ moving to the "line clear" position, with the respective distant signal $D^1$ ready in the "proceed" position. $W^4$ has opened the circuit through $R^4$, which has dropped its armature 154, thereby opening the circuits controlled by contacts 155 and 156, leaving the home signal $S^3$ in the "stop" position with contacts $c^3$ and $d^3$ remaining open, resulting in the distant signals $D^2$ and $D^3$ to remain in the "danger" position. After the last wheel of the last car of the train has left the next rail-contact ahead of contact 127, and not shown in the drawing, $W^4$ closes the contacts 155 and 156 through the action of $R^4$ and the subsequent attraction of armature 154, resulting in home signal $S^3$ moving to the "line clear" position, which closes the contacts $c^3$ and $d^3$; distant signal $D^2$ is returned to the "clear or proceed" position, while distant signal $D^3$ remains in the "danger" position on account of the open contact $d^4$, which is held open by the home signal $S^4$ in the "stop" position. While only four stations are illustrated, it is obvious that the system is not in any way limited as to the number of signal stations, the cycle of operation being essentially the same for each station. By connecting the safety device described in Fig. 8 in the signal circuits, a failure of the automatic wheel recorder to operate properly, due to some disturbance, would not prevent a full protection of the train, as the safety device would still compel the respective signal to move to the "danger or stop" position as described before. All switch relays are provided with a time limiting device that tends to minimize the possibility of momentarily wrong signal indications due to accidental closing of the switch relay contacts. The signal operating devices receive current from a common feeder G as shown, or they may be operated from any other suitable source of electrical energy.

We do not desire to limit ourselves to the particular construction, connections and arrangements of parts shown and described but aim, in the appended claims, to cover all modifications which are within the scope of our invention.

What we claim is:

1. In a railway train protection system and in combination two independently movable ratchet-wheels; a pawl for each ratchet-wheel; a spring for moving each pawl in a direction to actuate its respective ratchet-wheel; means for preventing return movement of the respective ratchet-wheels; a pawl-carrying member for each pawl to which the pawl is pivotally connected, and by which it can be moved in opposition to said spring; a positive stop for limiting the spring-induced movement of each pawl; means for controlling each of said pawl-carrying members at a separate portion of the railway track whereby passage of a car-unit over each of said track-portions is accompanied by similar movements of of said pawl-carrying members in opposition to the respective springs; means for resetting said ratchet wheels to their normal position and means for controlling a train on said track operable only when said wheels are initially in a predetermined relative position.

2. In a railway train protection system and in combination, a pair of ratchet-wheels; means whereby movements of the same degree are automatically imparted to the respective ratchet-wheels by the passage of the same car-unit over separate portions of the railway-track; hand-actuated mechanism for moving one of said ratchet-wheels independently of the other; and means for controlling a train on said track operable only when said wheels are initially in a predetermined relative position.

3. In a railway train protection system and in combination, a railway track; two car-actuated circuit-closing means located at different points along the track; normally inoperative means for controlling the passage of a train over said track; two independently electrically operated means controlled by the respective circuit-closing means; means for automatically releasing said controlling means when said electrically operated means are initially in predetermined relation to each other; and means for retarding the action of said releasing means.

4. In a railway train protection system and in combination, a railway track; two car-actuated circuit-closing means located at different points along the track; normally inoperative means for controlling the passage of a train over said track; two independently electrically operated means controlled by the respective circuit-closing means; means for automatically releasing said controlling means when said electrically operated means are initially in predetermined relation to each other; and a dashpot for retarding the action of said releasing means.

5. In a train-protection system and in combination, a track; a pair of indicators each having an index, said indexes being of similar shape, differently colored and concentrically rotatively mounted; means whereby movements of the same degree are imparted to the respective indexes by the passage of the same car-unit over successive portions of the track; and means for controlling a train on the track operable only when said indexes are initially in alinement.

6. A railway train protection system comprising two separate circuit closing means each constructed and fitted to close an electric circuit by the passage of a car unit thereover; normally inoperative means for controlling the passage of a train over the closing means; two independently operative means, one electrically connected with each of said circuit closing means, for counting and registering the number of said car units so passing thereover; means for releasing said controlling means automatically operated when said counting means have reached a predetermined relation to each other; and retarding means for momentarily delaying the action of said releasing means.

7. A railway train protection system comprising two separate circuit closing means each constructed and fitted to close an electric circuit by the passage of a car unit thereover; normally inoperative means for controlling the passage of a train over the closing means; an electro magnet forming part of each of such circuits; separate means, each actuated by one of said magnets, for counting and registering the number of said car units so passing thereover; means for releasing said controlling means; an independent electro-magnet for actuating said releasing means; and a third electric circuit including said last-named magnet and closable by the combined action of said first-named magnets only when they shall have actuated both said counting means an equal number of times.

GISBERT L. BOSSARD.

Witnesses as to Gisbert L. Bossard:
ELIZABETH A. RAY,
FRANK C. CURTIS.

RUD. ZAUGG.